United States Patent Office 2,992,913
Patented July 18, 1961

2,992,913
HERBICIDAL COMPOSITION AND METHOD EMPLOYING A COMBINATION OF A POLYCHLOROBENZOIC ACID AND A PHENOXYALIPHATIC ACID
Rudolf Koloman Pfeiffer, Cambridge, England, assignor to Fisons Pest Control Limited, Felixstowe, England
No Drawing. Filed May 6, 1957, Ser. No. 657,049
Claims priority, application Great Britain May 18, 1956
9 Claims. (Cl. 71—2.6)

The present invention relates to improved compositions and processes for the control of weeds and particularly the control of weeds present with cereal crops.

The so-called hormone weedkillers, comprising various phenoxyaliphatic acids such as for example 2-methyl-4-chlorophenoxyacetic acid (MCPA) and 2-4-dichlorophenoxyacetic acid (24D), are widely used as selective weedkillers in cereal crops. These compounds destroy or reduce the growth of many troublesome weeds at dosages where they do little or no damage to the cereal unless applied at a susceptible stage of growth. The weeds controlled by such compounds include charlock, thistles, fathen, docks, knotgrass and the like. The compounds however do not control graminous weeds, nor a few important dicotyledonous weeds, such as for example cleavers (*Galium aparine*) and chickweed (*Stellaria media*). The compound dinitro-orthocresol has been used to control these weeds, but this compound is very toxic to mammals and human beings, and necessitates special precautionary measures.

It has now been found as a result of numerous field trials that the compound 2:3:6-trichlorobenzoic acid when sprayed on the aerial or exposed parts of *Galium aparine*, for example as the sodium salt, at the very low dosage of about one ounce to eight ounces, for example four ounces per acre is so effective against these weeds that their further growth is wholly arrested. At these concentrations the ultimately lethal effect on the *Galium aparine* and *Stellaria media* is not immediately apparent, but further growth almost completely ceases, and after a period of several weeks, particularly in competition with the crop, the weed plants die out. At these low concentrations the effect on the cerial crop is entirely negligible, and the effect on many other weeds which can be controlled by other weedkillers is inadequate. The same effect has been found with 2:3:5:6-tetrachlorobenzoic acid and 2:6-dichlorobenzoic acid, the activity of the former being about 40–60%, and the latter about 10–30% of the activity of 2:3:6-trichlorobenzoic acid, depending on the species.

It has further been found that the use of a dosage of about one ounce to eight ounces, for example, four ounces per acre of 2:3:6-trichlorobenzoic acid, or correspondingly higher proportions of the 2:3:5:6-tetrachlorobenzoic acid or the 2:6-dichlorobenzoic acid in accordance with their lower activity, or salts or derivatives thereof together with a selective hormone weedkiller, or of a mixture of two or more selective hormone weedkillers, such for example as 2-methyl-4-chlorophenoxyacetic acid, 2:4-dichlorophenoxyacetic acid, 2:4:5-trichlorophenoxyacetic acid, gamma-2-methyl-4-chlorophenoxybutyric acid, gamma-2:4-dichlorophenoxybutyric acid, alpha-2-methyl-4-chlorophenoxypropionic acid and the like, or salts or derivatives of such compounds, produces a combined effect of the control of the weeds normally controlled by the hormone weedkillers and also of certain important weeds which are not controlled by the hormone weedkillers such as *Galium aparine* and *Stellaria media*. In such combined applications of the two types of weedkiller, the 2:3:6-trichlorobenzoic acid, 2:3:5:6-tetrachlorobenzoic acid and 2:6-dichlorobenzoic acid whilst effective against the hormone resistant weeds mentioned above, but ineffective against hormone susceptible weeds nevertheless assist synergistically the action of the hormone weedkiller or hormone-susceptible weeds without noticeable damage to the crop. Accordingly, less of the hormone weedkiller per acre is required for satisfactory control of hormone susceptible weeds than would be the case if no chlorobenzoic compound were present; the amount of hormone weedkiller normally required when sprayed or dusted alone can usually be reduced in the combined application. In the case of 2:3:6-trichlorobenzoic acid the amount of hormone weedkiller can be reduced by an amount at least equal to that of the 2:3:6-trichlorobenzoic acid present.

Accordingly, the present invention is for a process for the control of weeds, including hormone weedkiller resistant weeds, in crops by applying to the crops in combination at least one chlorobenzoic acid selected from the group comprising 2:3:6-trichlorobenzoic acid, 2:3:5:6-tetrachlorobenzoic acid and 2:6-dichlorobenzoic acid and one or more hormone weedkiller compounds, using the former in amount sufficient for the control of hormone weedkiller resistant weeds. The 2:3:6-trichlorobenzoic acid is suitably used at a rate of one to eight ounces per acre, and preferably about 4 ounces per acre; the 2:3:5:6-tetrachlorobenzoic acid is suitably used at a rate of two to twenty-four ounces, preferably ten ounces, per acre and the 2:6-dichlorobenzoic acid is suitably used at a rate of six to thirty-two ounces and preferably 20 ounces per acre.

The invention further provides a new composition comprising an admixture of one or more chlorobenzoic acids selected from the group comprising 2:3:6-trichlorobenzoic acid, 2:3:5:6-tetrachlorobenzoic acid and 2:6-dichlorobenzoic acid or salts or derivatives thereof together with a selective hormone weedkiller. The proportion of the compounds is preferably such that when the mixture is sprayed to give a rate of application to the ground of for example 2:3:6-trichlorobenzoic acid of about one ounce to eight ounces per acre, for example four ounces per acre, the concentration of the selective hormone weedkiller is appropriate to selectively control the weeds to be controlled with it. The proportions of the compounds are suitably such that the ratios of the chlorobenzoic acid to the selective hormone weedkiller is in the range of about 1:0.25 and 1:20 by weight, and preferably in the range about 1:1 and 1:10 by weight. In the case of 2:3:6-trichlorobenzoic acid it is preferred that the ratio is of the order of 1:2 to 1:4 of 2:3:6-trichlorobenzoic acid to hormone weedkiller. These ratios are based on the compounds in the form of the acids. In deciding on the proportion of any mixture of chlorobenzoic acids it is of course necessary to take into account the total activity of all the active isomers present viz. the 2:3:6-trichlorobenzoic acid, the 2:3:5:6-tetrachlorobenzoic acid and the 2:6-dichlorobenzoic acid. This total activity should be equivalent to the activity of the 2:3:6-trichlorobenzoic acid at the preferred rate indicated above.

The chlorobenzoic acid employed herein may be used in the form of the pure compounds or as mixtures with each other or with other chlorobenzoic acids.

The polychlorinated benzoic acids are normally obtained as mixtures of the various isomers. It is of course possible to isolate the 2:3:6-trichlorobenzoic, 2:3:5:6-tetrachlorobenzoic or 2:6-dichlorobenzoic acids as pure compounds, but it has been found unnecessary to use the pure compounds for weed control purposes, and mixtures with the other isomeric trichlorobenzoic acids, dichlorobenzoic acids and tetrachlorobenzoic acids may be used satisfactorily. Of these various isomers the compound 2:3:6-trichlorobenzoic acid is by far the most useful, followed by the 2:3:5:6-tetrachlorobenzoic acid and the 2:6-dichlorobenzoic acid, but at the same time certain other isomers such as for example the 2:3:5-trichlorobenzoic acid also show some toxicity to weeds. The presence of these other isomers is therefore of some assistance in the control of the weeds.

These chlorobenzoic acids may be used as the salts, for example, alkali metal or amine salts, or derivatives such as esters, amides and the like. The compounds are conveniently used in the form of water-soluble derivatives such as the alkali metal, amine and alkanolamine salts. If desired however the compounds may be used in the form of water-insoluble derivatives, such as esters, which may for example be sprayed as oil formulations or aqueous suspensions or emulsions.

The term selective hormone weedkiller is used to indicate those compounds comprising aroxyaliphatic acids such as 2:4-dichlorophenoxyacetic acid, 2-methyl-4-chlorophenoxyacetic acid, 2:4:5-trichlorophenoxyacetic acid, gamma-2:4-dichlorophenoxybutyric acid, gamma-2-methyl-4-chlorophenoxybutyric acid, alpha-2-methyl-4-chlorophenoxypropionic acid, and the like and their salts, for example alkali metal, amine and alkanolamine salts, and derivatives such as esters, amides and the like which are selective weedkillers. These compounds are normally used at a rate of about 0.4 to 2 pounds per acre.

According to one preferred embodiment the invention is for a composition comprising a mixture of a salt of 2:3:6-trichlorobenzoic acid, suitably the sodium and/or potassium salt, and a salt of 2-methyl-4-chlorophenoxyacetic acid, suitably the sodium and/or potassium salt, in the proportion of one part of the former to 0.5 to 10 parts of the latter.

According to a further embodiment the invention is for a composition comprising a mixture of a salt of 2:3:6-trichlorobenzoic acid, suitably an amine salt, a salt of 2-methyl-4-chlorophenoxyacetic acid, suitably an amine salt, and a salt of 2:4:5-trichlorophenoxyacetic acid, suitably an amine salt, suitably in the proportion of one part of the first to 0.25 to 10 parts of the second to 0.25 to 10 parts of the third component. A suitable composition comprises 2 to 4 parts of 2-methyl-4-chlorophenoxyacetic acid, 2 to 4 parts of 2:4:5-trichlorophenoxyacetic acid and 0.75 to 4 parts of 2:3:6-trichlorobenzoic acid, the acids being in the form of their ethylamine salts.

According to a yet further embodiment the invention is for a composition comprising a mixture of a salt of 2:3:6-trichlorobenzoic acid, suitably the sodium salt, and a salt of alpha-2-methyl-4-chlorophenoxypropionic acid, suitably the sodium salt in the proportion of one part of the former to 2 to 32 parts and preferably 6 parts of the latter. Compositions of this type may be used to kill chickweed (*Stellaria media*) as well as other weeds.

The sodium and other alkali metal salts of aroxyaliphatic acids and the chlorobenzoic acid are compatible and stable in aqueous solution. In these mixtures it is preferable to employ similar salts of the two compounds for example a mixture of the sodium salts of 2-methyl-4-chlorophenoxyacetic acid and the chlorobenzoic acids, or a mixture of amine salts, of these acids.

The compositions according to the present invention may be used for the control of weeds in various crops, either applied as a pre-emergence dressing or as a post-emergence dressing. These compositions are more generally used as post-emergence dressings and may be used in this way for the control of weeds in cereals, grassland, sugar cane and rice crops. These compositions may also be used as a pre-emergence dressing in maize and sugar cane crops.

The weeds which are controlled by the compositions according to the present invention include *Galium aparine* (cleavers), *Stellaria media* (chickweed), *Polygonum convolvulus* (black bindweed), *Anthemis cotula* (mayweed) in addition to the weeds controlled by the hormone type weedkillers. These compositions also contribute materially to the suppression of certain perennial weeds which are susceptible to the hormone type weedkillers such for example as thistle and perennial nettle.

The compositions according to the present invention may include any of the usual components such as surface active agents, stickers, diluents and other additives, used in the art. The compositions may be liquids suitable for spraying or powders suitable for dusting. The extent of dilution of the compositions according to the present invention for spraying appears to be non-critical. Thus for example the compositions may be applied at the same rate at any spray volume between 1 gallon per acre and 150 gallons per acre without significant variation. It is preferred however to spray at a volume of the order of 30 gallons per acre.

The following examples are given to illustrate the process of the present invention. The parts and percentages referred to are by weight unless otherwise indicated.

*Example 1*

A composition was made up comprising 80 parts of 2-methyl-4-chlorophenoxyacetic acid, as the sodium salt, and 40 parts of 2:3:6-trichlorobenzoic acid, as the sodium salt.

For spray purposes this was prepared in an aqueous solution containing 0.4 ounce of the composition per gallon of spray liquid.

The spray liquid was sprayed at a rate of thirty gallons per acre in ten experiments onto wheat infested with weeds and it was found that the weeds controlled included cleavers, mayweeds, black bindweed, charlock, poppy and thistles.

*Example 2*

A composition as described in Example 1 was made up and prepared in aqueous solution containing 4 ounces of the composition per gallon of spray liquid.

Four acres of a barley crop heavily infested with weeds, including cleavers, thistle and charlock was sprayed from an aircraft with this spray liquid at a rate of 3 gallons per acre. This treatment resulted in an excellent control of all weeds and in a yield increase of 60%.

A further four acres of the same barley crop was sprayed from a land vehicle with an aqueous solution of the composition as described in Example 1 containing 0.2 ounce of the composition per gallon and this was sprayed at a rate of 60 gallons per acre. This treatment also resulted in an excellent control of all weeds, and in a similar yield increase.

*Example 3*

A spray composition was prepared which contained 0.7 ounce per gallon of 2-methyl-4-chlorophenoxyacetic acid in the form of the mixed sodium and potassium salts and 0.3 ounce per gallon of 2:3:6-trichlorobenzoic acid in the form of its sodium salt. (The amounts of acids are expressed as free acid.) A plot of a wheat crop at the tillering stage heavily infested with cleavers about two inches tall and other weeds including charlock, fat-hen and dock was sprayed with this spray mixture at the rate of twelve gallons per acre. This treatment is equivalent to the application of 8.4 ounces of 2-methyl-4-chlorophenoxyacetic acid and 3.6 ounces of 2:3:6 trichlorobenzoic acid per acre. This treatment resulted in the excellent control of the cleavers as well as the other weeds including the charlock, fat-hen and dock and at the same time the wheat crop remained undamaged.

Solely by way of comparison another plot of the same wheat crop was sprayed with an aqueous solution containing 1.0 ounce per gallon of 2-methyl-4-chlorophenoxyacetic acid (expressed as free acid) in the form of the mixed sodium and potassium salts. The solution was sprayed at a rate of 12 gallons per acre, which is equivalent to the application of 12 ounces of 2-methyl-4-chlorophenoxyacetic acid per acre. This spraying treatment resulted in the control of the charlock, fat-hen and dock but did not control nor even affect the cleavers.

Example 4

A spray composition was prepared which contained 0.7 ounce per gallon of 2-methyl-4-chlorophenoxyacetic acid in the form of the mixed sodium and potassium salts and 1.2 ounces per gallon of 2:3:5:6-tetrachlorobenzoic acid in the form of its sodium salt. (The amounts of acid are expressed as free acid.) A further plot of the same wheat crop as referred to in Example 3 was sprayed with this spray mixture at the rate of 12 gallons per acre. This treatment is equivalent to the application of 8.4 ounces of 2-methyl-4-chlorophenoxyacetic acid and 14.4 ounces of 2:3:5:6-tetrachlorobenzoic acid per acre. This treatment resulted in the excellent control of the cleavers as well as the other weeds including the charlock, fat-hen and dock and at the same time the wheat crop remained undamaged.

Example 5

A spray composition was prepared which contained 0.7 ounce per gallon of 2-methyl-4-chlorophenoxyacetic acid in the form of the mixed sodium and potassium salts and 2.66 ounces per gallon of 2:6-dichlorobenzoic acid in the form of its sodium salt. (The amounts of acid are expressed as free acid.) A further plot of the same wheat crop as referred to in Example 3 was sprayed with this spray mixture at a rate of 12 gallons per acre. This treatment is equivalent to the application of 8.4 ounces of 2-methyl-4-chlorophenoxyacetic acid and 32 ounces of 2:6-dichlorobenzoic acid per acre. By this treatment the cleavers were severely checked, although not as well controlled as in Examples 3 and 4, and some scorch of the wheat crop was observed. The other weeds including charlock, fat-hen and dock were controlled.

Example 6

A technical mixture was obtained of chlorobenzoic acids, which contained those chlorobenzoic acids which possess a useful degree of herbicidal activity in the following proportions:

|  | Percent |
|---|---|
| 2:3:6-trichlorobenzoic acid | 54.7 |
| 2:3:5:6-tetrachlorobenzoic acid | 41.9 |
| 2:6-dichlorobenzoic acid | 3.4 |
|  | 100.0 |

A spray solution was prepared which contained 0.5 ounce per gallon of 2-methyl-4-chlorophenoxyacetic acid as the mixed sodium and potassium salts and 0.4 ounce per gallon of the above mixture of chlorobenzoic acids in the form of the mixed sodium and potassium salts. A plot of winter wheat infested with weeds was sprayed with this solution at a rate of 16 gallons per acre, which corresponds to a dosage rate per acre of 8 ounces of 2-methyl-4-chlorophenoxyacetic acid and 6.4 ounces of the chlorobenzoic acid mixture. This spray treatment achieved a satisfactory control of cleavers, poppy, thistles, fat-hen, charlock and dock in the wheat crop without affecting the wheat.

Example 7

A mixture of chlorobenzoic acids was obtained having the following composition:

|  | Percent |
|---|---|
| 2:6-dichlorobenzoic acid | 1.0 |
| Other dichlorobenzoic acids | 12.3 |
| 2:3:6-trichlorobenzoic acid | 7.8 |
| Other trichlorobenzoic acids | 23.8 |
| 2:3:5:6-tetrachlorobenzoic acid | 36.4 |
| Other tetrachlorobenzoic acids | 15.3 |
| Pentachlorobenzoic acid | 3.4 |
|  | 100.0 |

A spray solution was prepared which contained 0.5 ounce per gallon of 2-methyl-4-chlorophenoxyacetic acid as the mixed sodium and potassium salts and 1 ounce of the above mixture of chlorobenzoic acids in the form of the mixed sodium and potassium salts. A further plot of the winter wheat crop infested with weeds similar to that treated in Example 6 was sprayed with this solution at the rate of 16 gallons per acre, which corresponds to a dosage rate per acre of 8 ounces of 2-methyl-4-chlorophenoxyacetic acid and 16 ounces of the chlorobenzoic acid mixture. This spray treatment also achieved a satisfactory control of cleavers, poppy, thistles, fat-hen, charlock and dock in the wheat crop without affecting the wheat.

Example 8

A spray composition was prepared which contained 0.54 ounce per gallon of gamma-2-methyl-4-chlorophenoxybutyric acid (expressed as free acid) in the form of the ethylamine salt and 0.12 ounce per gallon of 2:3:6-trichlorobenzoic acid (expressed as free acid) in the form of the ethylamine salt. A plot of wheat heavily infested with weeds was sprayed with this spray mixture at the rate of 30 gallons per acre. This treatment is equivalent to the application of 16 ounces per acre of 2-methyl-4-chlorophenoxybutyric acid and 3.6 ounces of 2:3:6-trichlorobenzoic acid per acre. This treatment was found to give excellent control of charlock, thistle, knotgrass, cleavers and mayweed in the crop, without noticeable damage to the wheat.

I claim:

1. A process for the control of weeds in crops which comprises spraying a weed infested crop with a composition comprising (a) at least one chlorobenzoic compound selected from the group consisting of 2:3:6-trichlorobenzoic acid, 2:3:5:6-tetrachlorobenzoic acid, 2:6-dichlorobenzoic acid and salts thereof and (b) at least one phenoxyaliphatic hormone weedkiller compound selected from the group consisting of 2:4-dichlorophenoxyacetic acid, 2-methyl-4-chlorophenoxyacetic acid, 2:4:5-trichlorophenoxyacetic acid, gamma-2-methyl-4-chlorophenoxybutyric acid, gamma-2:4-dichlorophenoxybutyric acid, α-2-methyl-4-chlorophenoxypropionic acid and salts of the compounds; said chlorobenzoic compound being sprayed at the rate of from 1 to 32 ounces per acre, and said composition containing a weight ratio of chlorobenzoic compound to phenoxyaliphatic hormone weedkiller compound of from about 1:0.25 to about 1:32.

2. A composition for the control of weeds in crops which comprises a mixture of (a) at least one chlorobenzoic compound selected from the group consisting of 2:3:6-trichlorobenzoic acid, 2:3:5:6-tetrachlorobenzoic acid, 2:6-dichlorobenzoic acid and salts thereof and (b) at least one phenoxyaliphatic hormone weedkiller compound selected from the group consisting of 2:4-dichlorophenoxyacetic acid, 2-methyl-4-chlorophenoxyacetic acid, 2:4:5-trichlorophenoxyacetic acid, gamma-2-methyl-4-chlorophenoxybutyric acid, gamma-2:4-dichlorophenoxybutyric acid, alpha-2-methyl-4-chlorophenoxypropionic acid and salts of said compounds; said composition containing a weight ratio of chlorobenzoic compound to phenoxyaliphatic hormone weedkiller compound of from about 1:0.25 to about 1:32.

3. A composition for the control of weeds in crops which comprises a mixture of (a) at least one chlorobenzoic compound selected from the group consisting of 2:3:6-trichlorobenzoic acid, 2:3:5:6-tetrachlorobenzoic acid, 2:6-dichlorobenzoic acid and salts thereof and (b) at least one phenoxyaliphatic hormone weedkiller compound selected from the group consisting of 2:4-dichlorophenoxyacetic acid, 2-methyl-4-chlorophenoxyacetic acid, 2:4:5-trichlorophenoxyacetic acid, gamma-2-methyl-4-chlorophenoxybutyric acid, gamma-2:4-dichlorophenoxybutyric acid, α-2-methyl-4-chlorophenoxypropionic acid and salts of said compounds; said composition containing a weight ratio of chlorobenzoic compound to phenoxyaliphatic hormone weedkiller compound of from about 1:0.25 to 1:20 by weight.

4. A composition for the control of weeds in crops which comprises a mixture of (a) at least one chlorobenzoic compound selected from the group consisting of 2:3:6-trichlorobenzoic acid, 2:3:5:6-tetrachlorobenzoic acid, 2:6-dichlorobenzoic acid and salts thereof and (b) at least one phenoxyaliphatic hormone weedkiller compound selected from the group consisting of 2:4-dichlorophenoxyacetic acid, 2-methyl-4-chlorophenoxyacetic acid, 2:4:5-trichlorophenoxyacetic acid, gamma-2-methyl-4-chlorophenoxybutyric acid, gamma-2:4-dichlorophenoxybutyric acid, alpha-2-methyl-4-chlorophenoxypropionic acid and salts of said compounds; said composition containing a weight ratio of chlorobenzoic compound to phenoxyaliphatic hormone weedkiller compound of from about 1:1 to about 1:10 by weight.

5. A process for the control of weeds in crops which comprises spraying a weed infested crop with a composition comprising 2:3:6-trichlorobenzoic acid and at least one phenoxyaliphatic hormone weedkiller compound selected from the group consisting of 2:4-dichlorophenoxyacetic acid, 2-methyl-4-chlorophenoxyacetic acid, 2:4:5-trichlorophenoxyacetic acid, gamma-2-methyl-4-chlorophenoxybutyric acid, gamma-2:4-dichlorophenoxybutyric acid, alpha-2-methyl-4-chlorophenoxypropionic acid and salts of said compounds; said trichlorobenzoic acid being sprayed at the rate of from 1 to 8 ounces per acre and said composition containing a weight ratio of trichlorobenzoic acid to phenoxyaliphatic hormone weedkiller compound of from about 1:0.25 to about 1:32.

6. A composition which comprises a mixture of a salt of 2:3:6-trichlorobenzoic acid and a salt of 2-methyl-4-chlorophenoxyacetic acid in a weight ratio of 1 part of the former to from 0.25 to 20 parts of the latter.

7. A composition as claimed in claim 6 wherein the ratio of the salt of 2:3:6-trichlorobenzoic acid to the salt of 2-methyl-4-chlorophenoxyacetic acid is in the range 1:1 to 1:10 by weight, based on the respective acids.

8. A composition as claimed in claim 6 wherein the salts of 2:3:6-trichlorobenzoic acid and 2-methyl-3-chlorophenoxyacetic acid are the alkali metal salts.

9. A composition which comprises a mixture of a salt of 2:3:6-trichlorobenzoic acid and a salt of 2:4-dichlorophenoxyacetic acid in a weight ratio of one part of the former to from 0.25 to 20 parts of the latter.

References Cited in the file of this patent
UNITED STATES PATENTS

| 2,390,941 | Jones | Dec. 11, 1945 |
| 2,412,510 | Jones | Dec. 10, 1946 |
| 2,637,639 | Talbot et al. | May 5, 1953 |
| 2,724,724 | Gonze | Nov. 22, 1955 |
| 2,726,947 | Baumgartner | Dec. 13, 1955 |

FOREIGN PATENTS

| 598.104 | Great Britain | Feb. 10, 1948 |
| 598,105 | Great Britain | Feb. 10, 1948 |

OTHER REFERENCES

Hitchcock et al., in "Contrib. Boyce Thompson Institute," vol. 15, No. 4, July-September 1948, pages 173 to 193 incl.

Zimmerman et al., in "Contrib. Boyce Thompson Institute," vol. 16, No. 5, January-March 1951, pages 209 to 213 incl.

Miller, in "Weeds," January 1952, pages 185 to 188 incl.

Notice of Adverse Decision in Interference

In Interference No. 92,928 involving Patent No. 2,992,913, R. K. Pfeiffer, Herbicidal composition and method employing a combination of a polychlorobenzoic acid and a phenoxyaliphatic acid, final judgment adverse to the patentee was rendered Jan. 8, 1964, as to claim 9.

[*Official Gazette April 28, 1964.*]